(12) United States Patent
Yoshino et al.

(10) Patent No.: US 9,612,595 B2
(45) Date of Patent: Apr. 4, 2017

(54) CHATTER VIBRATION SUPPRESSING METHOD AND MACHINE TOOL

(71) Applicant: OKUMA Corporation, Niwa-gun, Aichi (JP)

(72) Inventors: Kiyoshi Yoshino, Aichi (JP); Yuto Mizukami, Aichi (JP); Takayuki Kato, Aichi (JP); Noriyoshi Ito, Aichi (JP); Nobuki Nishidera, Aichi (JP)

(73) Assignee: OKUMA CORPORATION (JP)

( * ) Notice: Subject to any disclaimer, the term of this patent is extended or adjusted under 35 U.S.C. 154(b) by 465 days.

(21) Appl. No.: 14/057,078

(22) Filed: Oct. 18, 2013

(65) Prior Publication Data

US 2014/0114462 A1  Apr. 24, 2014

(30) Foreign Application Priority Data

Oct. 18, 2012  (JP) .................................. 2012-231114

(51) Int. Cl.
*G06F 19/00* (2011.01)
*G05B 19/404* (2006.01)

(52) U.S. Cl.
CPC .. *G05B 19/404* (2013.01); *G05B 2219/41115* (2013.01)

(58) Field of Classification Search
CPC .................... G05B 19/404; G05B 2219/41115
USPC ................. 700/175–179, 160, 161
See application file for complete search history.

(56) References Cited

U.S. PATENT DOCUMENTS

| | | | |
|---|---|---|---|
| 4,509,126 A | 4/1985 | Olig et al. | |
| 4,547,847 A * | 10/1985 | Olig et al. | ...................... 700/52 |
| 6,438,445 B1 | 8/2002 | Yoshida et al. | |
| 7,473,160 B1 * | 1/2009 | Gerstner | ............................ 451/7 |
| 7,933,679 B1 * | 4/2011 | Kulkarni et al. | ............. 700/173 |
| 2005/0016338 A1 * | 1/2005 | Gerdes et al. | .................. 82/112 |
| 2008/0298912 A1 * | 12/2008 | Schmitz et al. | ............. 408/143 |
| 2009/0248194 A1 * | 10/2009 | Lammering et al. | ......... 700/173 |
| 2010/0251066 A1 * | 9/2010 | Radke | ........................... 714/752 |
| 2012/0097411 A1 | 4/2012 | Yoshino et al. | |
| 2012/0109360 A1 | 5/2012 | Nishimura et al. | |

FOREIGN PATENT DOCUMENTS

| | | |
|---|---|---|
| JP | 49-105277 A | 10/1974 |
| JP | 61-3522 U | 2/1986 |
| JP | 05046234 A | 2/1993 |

(Continued)

OTHER PUBLICATIONS

Siddiqui-A.,"Chatter Suppression in Machining Processes", Masters Thesis, Ryerson University, Toronto, 2004, 109 pages.*

(Continued)

*Primary Examiner* — Robert Fennema
*Assistant Examiner* — Thomas Stevens
(74) *Attorney, Agent, or Firm* — McCarter & English, LLP

(57) ABSTRACT

A chatter vibration suppressing method includes acquiring a moment of inertia of a rotating body, recording a value indicating the acquired moment of inertia into a machining program, and calculating a variable amplitude and a variable period when a rotation speed of the rotating body is varied in order to suppress chatter vibration from the value indicating the moment of inertia recorded in the machining program and the maximum input power of a motor for rotating the rotating body.

4 Claims, 2 Drawing Sheets

(56) References Cited

FOREIGN PATENT DOCUMENTS

| | | | |
|---|---|---|---|
| JP | 2000099123 | A | 4/2000 |
| JP | 2004074349 | A | 11/2004 |
| JP | 2006346760 | A | 12/2006 |
| JP | 2010188499 | A | 9/2010 |
| JP | 2012091283 | A | 5/2012 |
| JP | 2012130983 | A | 12/2012 |
| WO | 9841357 | A1 | 9/1998 |

OTHER PUBLICATIONS

Notice of Grounds for Rejection (Japanese Office Action) for Japanese Patent Application No. 2012-231114. Issued Jan. 19, 2016. 7 pages.
Office Action Issued May 6, 2016 for Chinese Patent Application CN 201310475810.8. 8 pages.
Office Action Issued Dec. 21, 2016 for Chinese Patent Application CN 201310475810.8. 16 pages.

\* cited by examiner

```
INA=0.5
G0 X1000 Z1000
T0101
    .
    .
    .
```

CHATTER VIBRATION SUPPRESSING METHOD AND MACHINE TOOL

CROSS-REFERENCE TO RELATED APPLICATION

This application claims priority to Japanese Patent Application No. 2012-231114, filed on Oct. 18, 2012, which is incorporated herein by reference in its entirety.

FIELD OF THE INVENTION

The present invention relates to a control method of suppressing chatter vibration, which is produced during machining by a machine tool, by changing the rotation speed of a rotating shaft, and to a machine tool.

BACKGROUND OF THE INVENTION

When cutting work is performed by a machine tool, so-called "chatter vibration" is occasionally generated if the tool or the workpiece has low rigidity. Generation of chatter vibration causes a problem such as breakage of the tool or degradation of surface accuracy of the workpiece. This chatter vibration is generated due to fluctuation in cut-off thickness of the workpiece and an increase in vibration because of generation of a phase delay between undulation (vibration) caused on the machined surface before one rotation and vibration due to the current cutting. As technology for suppressing chatter vibration, measures have been proposed by JP 49-105277 A and JP 61-3522 U. The technologies described in JP 49-105277 A and JP 61-3522 U vary the rotation speed of the rotating shaft to make the force inputted to the tool irregular so as to suppress chatter vibration. JP 49-105277 A and JP 61-3522 U disclose a device that suppresses chatter vibration by setting a variable amplitude and a variable period when the rotation speed of the rotating shaft is varied.

The methods described in JP 49-105277 A and JP 61-3522 U, however, require setting of two values of a variable amplitude and a variable period to vary the rotation speed. In order to suppress chatter vibration, it is known that the effect is high when a variable period is set short at a variable amplitude of a certain value or higher. That is to say, it is known that the chatter vibration suppressing effect is high when the rotating shaft is accelerated and decelerated sharply. When the rotating shaft is repeatedly accelerated and decelerated excessively, however, input power into the motor increases, and there is a possibility of the motor produces heat and is broken.

Accordingly, there is considered a method of performing the originally intended machining after a limit value of varying the rotation speed was found from the maximum input power of the motor and the moment of inertia of the rotating body. To do so, it is necessary to perform a dedicated operation to determine the moment of inertia and to record it in an NC device for controlling the machine tool. When the same workpiece is machined, it is not necessary to update the moment of inertia, but when a different workpiece is machined, it is necessary to perform the dedicated operation to determine the moment of inertia again, or the operator needs to set the previously determined moment of inertia into the NC device, thereby increasing the number of work steps. When the same workpiece is machined by another machine tool, the same number of work steps is needed, and the process is not rational.

SUMMARY OF THE INVENTION

The present invention has been achieved in view of the above-noted problems, and an advantage of the invention is to provide a method of suppressing chatter vibration without breakage of a motor, by calculating a limit of variation of a rotation speed easily without determining a moment of inertia of a workpiece every time it is machined, and to provide a machine tool.

The chatter vibration suppressing method of the present invention is a chatter vibration suppressing method for suppressing chatter vibration of a machine tool which performs cutting work by rotating a rotating body including a workpiece or a tool according to a machining program stored in a storage unit, comprising an acquisition step of acquiring a moment of inertia of the rotating body; a recording step of recording a value indicating the acquired moment of inertia into the machining program; and a calculation step of calculating a variable amplitude and a variable period when a rotation speed of the rotating body is varied in order to suppress the chatter vibration from the value indicating the moment of inertia recorded in the machining program and the maximum input power of a motor for rotating the rotating body.

According to a preferable embodiment, a value obtained by subtracting the previously stored moment of inertia of a rotating part of the machine tool from the acquired moment of inertia of the rotating body is recorded into the machining program as the value indicating the moment of inertia. According to another preferable embodiment, when it is instructed by the machining program to machine the workpiece in a plurality of separate steps, the moment of inertia of the rotating body is acquired for the respective steps in the acquisition step; and the value indicating the moment of inertia of the rotating body acquired for the respective steps is stored for the respective steps into the machining program in the recording step.

The machine tool according to another aspect of the invention is a machine tool for performing cutting work by rotating a rotating body including a workpiece or a tool according to a machining program stored in a storage unit, comprising a moment of inertia acquisition unit for acquiring a moment of inertia of the rotating body; a recording unit for recording the acquired moment of inertia into the machining program when the moment of inertia is acquired by the moment of inertia acquisition unit; and a calculating unit for calculating a variable amplitude and a variable period when a rotation speed of the rotating body is varied in order to suppress chatter vibration from the moment of inertia recorded in the machining program and the maximum input power of a motor for rotating the rotating body.

According to the present invention, since the once-determined moment of inertia is recorded in the machining program, it is not necessary to perform the same operation to determine the moment of inertia when the same workpiece is machined, and a limit of variation of the rotation speed can be calculated easily to suppress chatter vibration without breakage of the motor.

BRIEF DESCRIPTION OF THE DRAWINGS

Embodiment(s) of the present invention will be described in detail by reference to the following figures, wherein.

DETAILED DESCRIPTION OF EMBODIMENTS OF THE INVENTION

Figure 1:
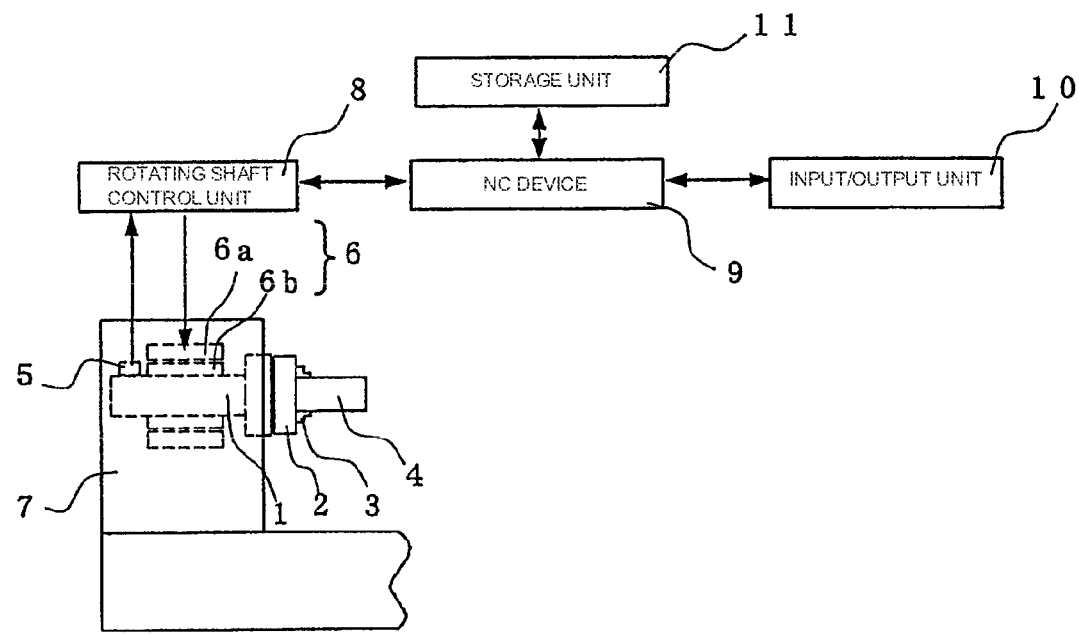
FIG. 1 is a schematic structural view of an NC lathe according to an embodiment of the present invention.

Embodiments of the present invention are described below with reference to the accompanying drawings. FIG. 1 is a schematic structural view of an NC lathe according to an embodiment of the present invention. A headstock 7 axially and rotatably supports a main spindle 1 which holds a workpiece 4 via a chuck 2 and a pawl 3. A rotating body consisting of the main spindle 1, a rotor 6b, the chuck 2, the pawl 3, and the workpiece 4 is driven to rotate by a motor 6 which comprises a stator 6a fixed to the headstock 7 and the rotor 6b fixed to the main spindle 1. An encoder 5 for detecting a rotation speed of the main spindle 1 is fixed to the headstock 7. A rotating shaft control unit 8 is connected to the motor 6 and the encoder 5, and an NC device 9 instructs the rotation speed to the rotating shaft control unit 8. The rotating shaft control unit 8 keeps monitoring the rotation speed of the main spindle 1 detected by the encoder 5 and adjusts the input current applied to the motor 6 to rotate the rotating body at the rotation speed instructed from the NC device 9.

Figure 2:
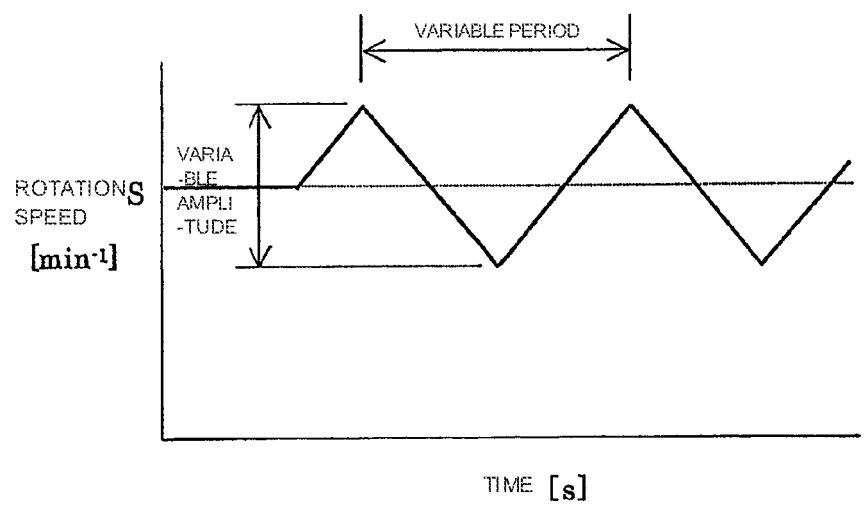
FIG. 2 is an explanatory view showing an example of fluctuation of a rotation speed of a rotating shaft.

The NC device 9 is connected with a storage unit 11 for storing a machining program and the like, and an input/output unit 10 for outputting through a monitor or the like and for inputting through a keyboard or the like. The NC device 9 performs cutting work by moving an unshown tool in a rotating shaft direction and/or a radial direction of the workpiece 4 while rotating the main spindle 1 according to the machining program stored in the storage unit 11. In addition, the NC device 9 is inputted with a rotation speed, a variable amplitude, and a variable period of the main spindle 1 from the input/output unit 10. Thus, the rotation speed of the main spindle 1 can be varied at the designated variable amplitude and variable period via the NC device 9 and the rotating shaft control unit 8 as shown in FIG. 2.

The moment of inertia can be determined from the electric current inputted to the stator 6a and the change of rotation speed of the rotating body. For example, when a speed instruction is issued from the NC device 9 to the rotating shaft control unit 8 to rotate the rotating body at a certain rotation speed, the rotating body gradually speeds up from a stopped state to the instructed rotation speed. At this time, moment of inertia J and angular acceleration a of the rotating body are expressed by expression 1 in relation to torque T of the motor 6.

$$T = J \cdot \alpha \quad (1)$$

The torque T can be expressed by expression 2 in relation to input current I and a torque constant k, which depends on the motor.

$$T = k \cdot I \quad (2)$$

Here, the angular acceleration a can be calculated from a variation amount of the rotation speed detected by the encoder 5, and the input current I which is inputted by the rotating shaft control unit 8 is known well. Therefore, the moment of inertia J can be calculated by expression 1 and expression 2. Such calculation is performed by the NC device 9, and the determined moment of inertia is recorded in the machining program of the NC device 9. The encoder 5 and the NC device 9 which calculates the moment of inertia function as acquisition units for acquiring the moment of inertia of the rotating body.

Figures 3, 4:
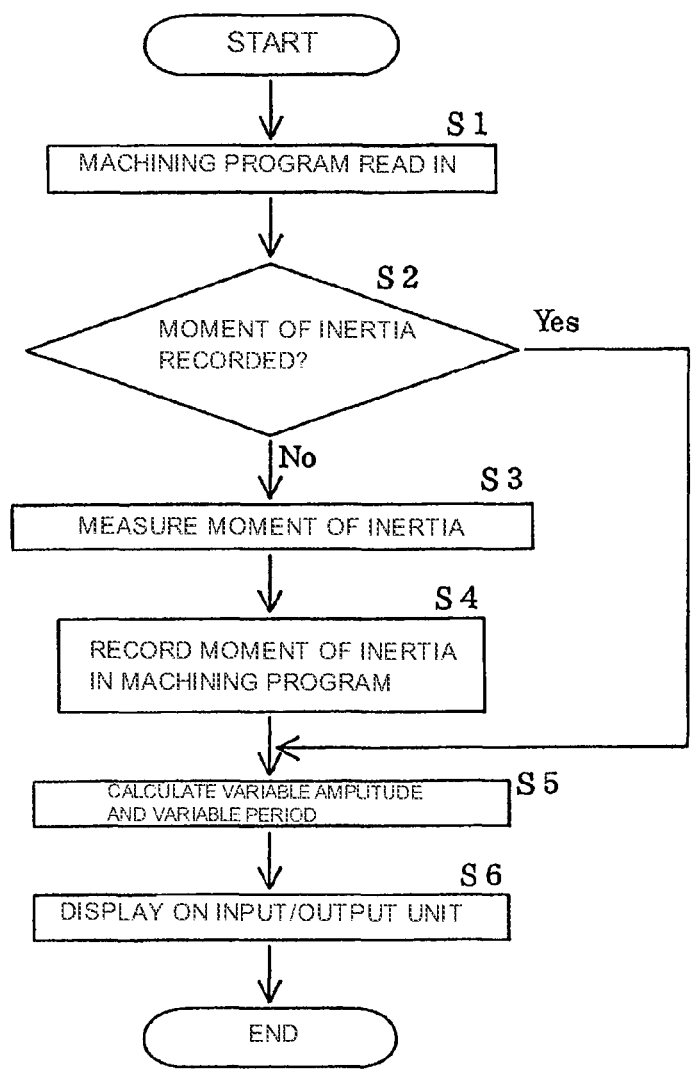
FIG. 3 is a flow chart of a chatter vibration suppressing method.
FIG. 4 is an explanatory view showing part of a machining program.

The chatter vibration suppressing method used for the NC lathe of this embodiment is described with reference to the flow chart of FIG. 3. In step S1, a workpiece machining program is read from the storage unit 11 into the NC device 9. In step S2, it is judged whether or not the moment of inertia J is recorded in the machining program as a whole, and if it is not recorded, the process advances to step S3, and if it is recorded, the process advances to step S5. In the step S3, the moment of inertia of the rotating body is measured by a known method. In addition to the above-described method, there has been proposed, for example, a method for determining a moment of inertia from the input current applied to the motor 6 when the rotating body is accelerated or decelerated and the change of rotation speed at that time.

In step S4, the NC device 9 which functions as recording means records the moment of inertia determined in the step S3 into the machining program within the NC device 9. An example of the recorded machining program is shown in FIG. 4. When the moment of inertia determined in the step S3 is, for example, 0.5 kg·m², this numerical value "0.5" is recorded subsequent to a variable name INA of the moment of inertia at the head of the machining program. In the step S5, the NC device 9, which functions as calculation means, determines from expression 3 a limit variable amplitude and a variable period when the rotation speed is varied from the moment of inertia recorded in the program and the maximum input power of the motor 6 previously stored in the storage unit 11. In expression 3, Q is a rotation speed variable amplitude [%], R is a rotation speed variable period [sec], S is a main spindle rotation speed [min⁻¹], and P is the maximum input power [W] of the motor.

$$Q = 4500 \cdot P \cdot R / (\pi^2 \cdot S^2 \cdot J) \quad (3)$$

Since the relation between the variable amplitude and the variable period obtained here is a primary expression, it may be displayed as a graph, or a representative value may be displayed as a numerical value on a monitor of the input/output unit 10 in step S6.

In the step S4, the moment of inertia was recorded in the machining program within the NC device 9. By storing the machining program, the machining program in which the moment of inertia was recorded is stored in the storage unit 11. From this point forward, the machining program, in which the moment of inertia was also recorded, can be read in.

Since the once-determined moment of inertia can be recorded in the machining program by the above procedure, it is not necessary to perform the same operation to determine the moment of inertia when the same workpiece is machined, and a limit of variation of the rotation speed can be calculated easily. Therefore, the chatter vibration can be suppressed without breakage of the motor.

In the step S4, the moment of inertia of the rotating body was recorded, but the moment of inertia obtained by subtracting the moment of inertia of a rotating part of the machine tool may be recorded. That is, the main spindle 1 inherent to the NC lathe and the moment of inertia of the rotor 6b are previously stored in the storage unit 11, and the stored value may be subtracted from the measured moment of inertia of the rotating body to record the result. Thus, to use another NC lathe for machining, the moment of inertia recorded in the machining program can be simply adding to the main spindle inherent to the NC lathe and the moment of inertia of the rotor to determine the moment of inertia of the rotating body. Therefore, by simply moving to the position of another NC lathe and using the workpiece and the machining program as a set, the operation to determine the moment of inertia can be omitted and the chatter vibration can be suppressed rationally and universally.

The method of measuring the moment of inertia in the initial state before machining was described above, but it is also possible to measure the moment of inertia in each step to record the result in the machining program. Since the workpiece is cut down by machining, the moment of inertia decreases. Therefore, for example, the moment of inertia is measured in respective machining steps such as a rough machining step for an outer shape and a finish machining step for an inner diameter, and recorded at a breakpoint between the machining steps. Thus, the moment of inertia appropriate for the respective steps can be obtained. The obtained value can be used to calculate the variable amplitude and the variable period optimum for the rotation speed in the respective steps.

An example of the NC lathe for performing the cutting work while rotating the workpiece was described above, but the present invention can also be applied to other machine tools such as a machining center that performs the cutting work while rotating the tool.

What is claimed is:

1. A method for suppressing chatter vibration of a machine tool which performs cutting work by rotating a rotating body including a workpiece or a tool according to a machining program stored in a storage unit, the method comprising:
    reading, with an NC device of the machine tool, the machining program stored in the storage unit and determining whether a value indicating a moment of inertia of the rotating body is stored in the machining program;
    when a value indicating the moment of inertia is not stored in the machining program, acquiring, with the NC device, a moment of inertia of the rotating body and recording a value indicating the moment of inertia of the rotating body into the machining program;
    calculating, with the NC device, a variable amplitude and a variable period when a rotation speed of the rotating body is varied in order to suppress chatter vibration from the value indicating the moment of inertia of the rotating body recorded in the machining program and a maximum input power of a motor adapted for rotating the rotating body; and
    rotating the rotating body based on the calculated variable amplitude and variable period.

2. The method according to claim 1, further comprising the step of calculating said value indicating the moment of inertia of the rotating body by subtracting a previously stored moment of inertia of a rotating part of the machine tool from the moment of inertia of the rotating body acquired in said acquiring step.

3. The method according to claim 1, wherein when the machining tool is instructed by the machining program to machine the workpiece in a plurality of separate machining steps, the step of acquiring the moment of inertia of the rotating body is performed for each machining step; and the step of recording the value indicating the moment of inertia of the rotating body into the machining program is performed for each machining step.

4. A machine tool for performing cutting work by rotating a rotating body including a workpiece or a tool according to a machining program stored in a storage unit, comprising:
    a unit configured to read the machining program stored in the storage unit and determine whether a value indicating a moment of inertia of the rotating body is stored in the machining program;
    a moment of inertia acquisition unit configured to acquire the moment of inertia of the rotating body when a value indicating the moment of inertia is not stored in the machining program;
    a recording unit configured to record the value indicating the moment of inertia of the rotating body into the machining program when the moment of inertia is acquired by the moment of inertia acquisition unit;
    a calculating unit configured to calculate a variable amplitude and a variable period when a rotation speed of the rotating body is varied in order to suppress chatter vibration from the moment of inertia of the rotating body recorded in the machining program and a maximum input power of a motor for rotating the rotating body.

* * * * *

UNITED STATES PATENT AND TRADEMARK OFFICE
CERTIFICATE OF CORRECTION

| | |
|---|---|
| PATENT NO. | : 9,612,595 B2 |
| APPLICATION NO. | : 14/057078 |
| DATED | : April 4, 2017 |
| INVENTOR(S) | : Yoshino et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 606 days.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*